(No Model.)　　　　　　　　　　　　　　　　　4 Sheets—Sheet 1.
J. F. PACKER.
BED PLATE FOR SULKY PLOW BEAMS.
No. 323,442.　　　　　　　　　Patented Aug. 4, 1885.

Witnesses:
C. W. Bond
Albert H. Adams.

Inventor:
John F. Packer (No Model.)  4 Sheets—Sheet 2.

J. F. PACKER.
BED PLATE FOR SULKY PLOW BEAMS.

No. 323,442.  Patented Aug. 4, 1885.

Witnesses:

Inventor:
John F. Packer (No Model.) 4 Sheets—Sheet 3.

J. F. PACKER.
BED PLATE FOR SULKY PLOW BEAMS.

No. 323,442. Patented Aug. 4, 1885.

Witnesses:
O. W. Bond
Albert H. Adams

Inventor:
John F. Packer (No Model.) 4 Sheets—Sheet 4.
J. F. PACKER.
BED PLATE FOR SULKY PLOW BEAMS.
No. 323,442. Patented Aug. 4, 1885.
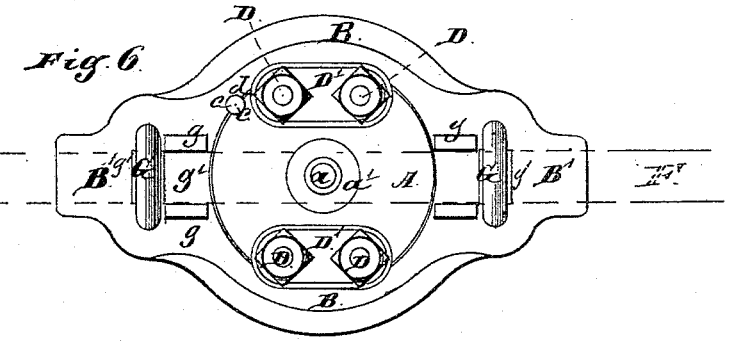
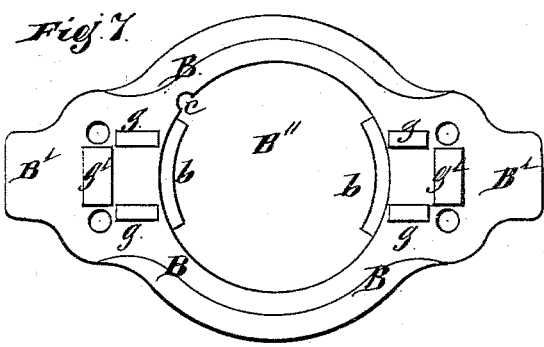
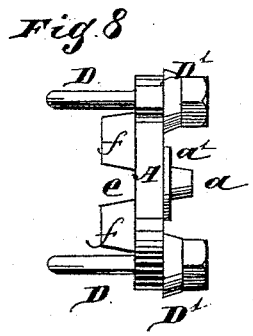
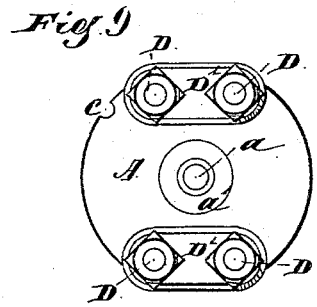
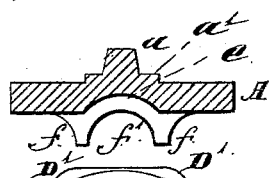
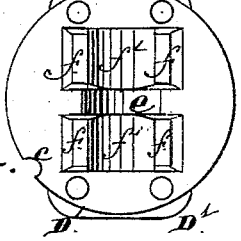
Witnesses:
O. W. Bond
Albert H. Adams
Inventor:
John F. Packer

UNITED STATES PATENT OFFICE.

JOHN F. PACKER, OF CHICAGO, ILLINOIS, ASSIGNOR TO DAVID BRADLEY MANUFACTURING COMPANY, OF SAME PLACE.

BED-PLATE FOR SULKY-PLOW BEAMS.

SPECIFICATION forming part of Letters Patent No. 323,442, dated August 4, 1885.

Application filed October 28, 1884. (No model.)

*To all whom it may concern:*

Be it known that I, JOHN F. PACKER, residing at Chicago, in the county of Cook and State of Illinois, and a citizen of the United States, have invented a new and useful Improvement in Bed-Plates for Sulky-Plow Beams, of which the following is a full description, reference being had to the accompanying drawings, in which—

Figure 1:
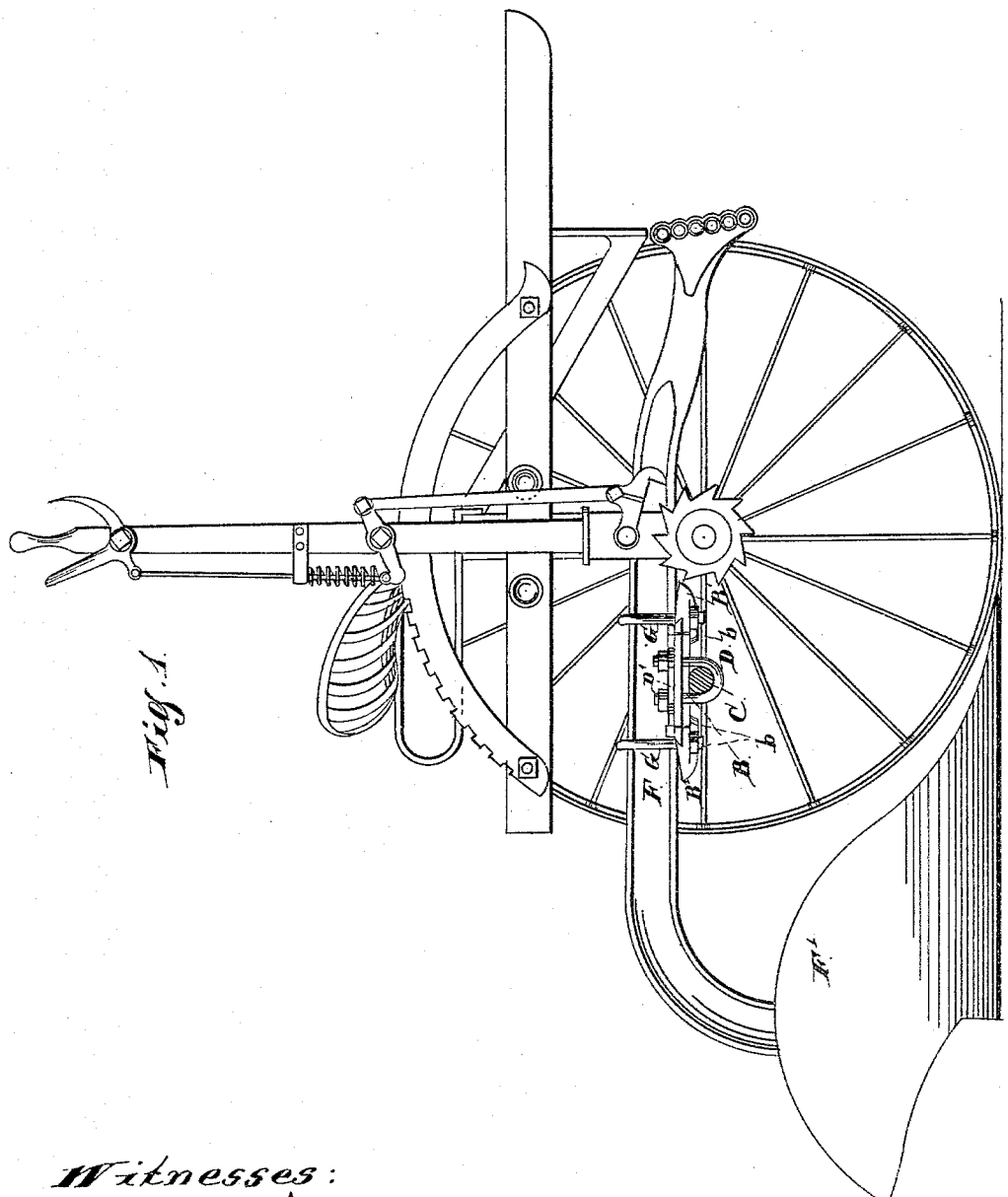
Figure 2:
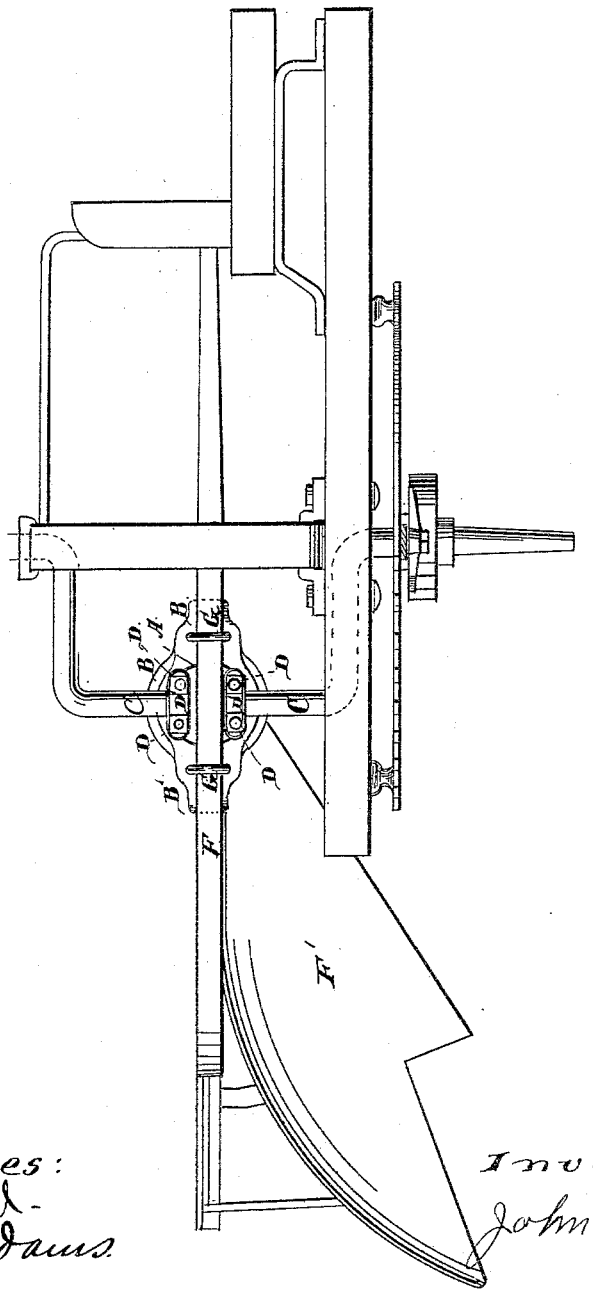
Figure 3:
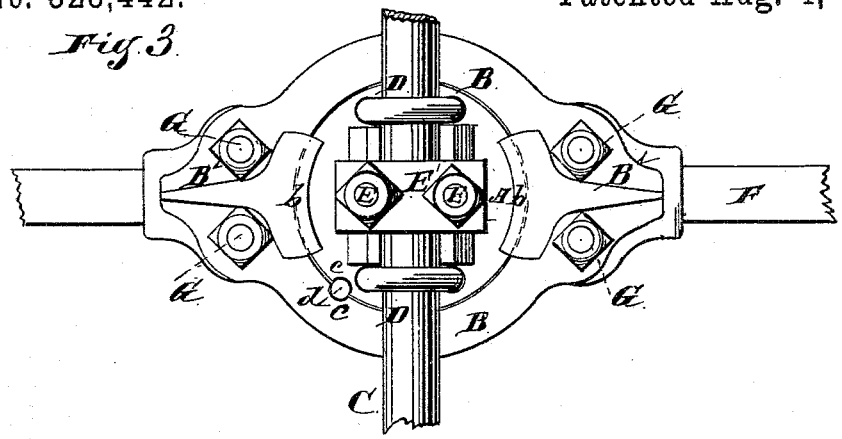
Figure 4:
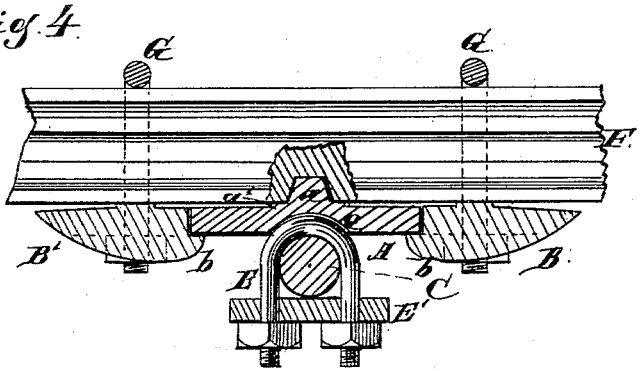
Figure 5:
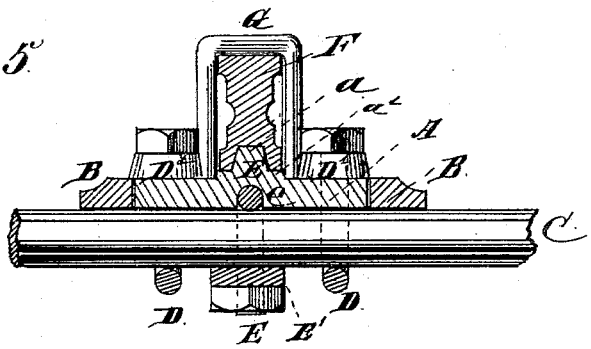

Figure 1 is a side elevation, with one of the wheels removed and the bail in section; Fig. 2, a plan view, with the wheels and the devices for adjusting the running depth and leveling the plow and the seat removed; Fig. 3, a plan view of the bed-plate, showing the under side; Fig. 4, a vertical longitudinal section through the bed-plate and bail; Fig. 5, a transverse vertical section through the bed-plate and beam; Fig. 6, a plan view of the bed-plate, showing the upper side; Fig. 7, a plan view of the upper side of the outer or ring portion of the bed-plate; Fig. 8, an edge elevation of the center plate; Fig. 9, a plan view showing the upper side of the center plate; Fig. 10, a section through the center-plate; Fig. 11, a plan view showing the under side of the center plate.

This invention has for its objects to support the plow-beam on the bail, so that it can be left free to swing transversely or be locked rigid, as may be required, and at the same time give the beam a support which it will ride squarely and firmly, and will not be liable to bind when the beam is allowed to swing free laterally.

The object of my invention I accomplish in the manner hereinafter described and claimed, and as illustrated in the accompanying drawings.

In the drawings, A represents the center plate or disk, having on its upper face an upwardly-projecting circular stud or trunnion, $a$, with a circular base, $a'$, which base is slightly above the face of the bed-plate proper. The under face of the plate A, at the center, has a recess, $e$, having a curve transverse to the bail, and which fits over and receives the end of a clip, by which the plate is held from lateral movement on the bail, and at the same time allow the plate to be adjusted laterally on the bail for the width of furrow to be plowed; and the under side of this plate is also provided with depending ears $f$, two on each side of the recess, which ears have a semicircular opening or recess, $f'$, to receive and fit over the bail and form a support for the plate on the bail, as shown in Figs. 8, 10, and 11.

B is the ring or outer support, having a circular opening, B'', corresponding in diameter to the diameter of the plate A, and in which the plate fits. This ring or support B is not circular its entire circumference, but has on opposite sides projections or ears B' for the passage of the clips by which the ring or support is attached to the plow-beam. The central opening, B'', has projecting therein, on opposite sides, flanges or ledges $b$, which form a rest for the under side of the plate A, and the periphery of this opening B'' has a semicircular recess, $c$, which, when the parts are to be locked, coincides with a similar recess, $c$, in the edge of the plate A to receive a pin, $d$, by which the plate A will be locked with the ring or support B, so as to be, in effect, a part of the ring or support. The ring or support B, when the pin $d$ is not in the hole $c$, is free to turn around the plate or disk A as a center, and when the parts are together the flanges or projections $b$, engaging with the under face of the plate A, prevent the ring or support from rising and tipping fore and aft, except as the plate A is raised by the swing of the bail or is rocked on the bail.

C is the bail, of the usual form of construction in sulky-plows, and on which the plate A is mounted.

D are clips passed, as shown, under the bail C, and up on each side thereof and through the plate A, passing through a plate, D', and secured in position by nuts on their open end above the plate D', a clip being provided and used on opposite sides of the plate A, as shown in Figs. 3 and 5. The plates D' at their outer edge project slightly beyond the periphery of the plate A, so as to rest on the upper surface of the ring B and form a lock in connection with the flanges $b$, by which the plate A and ring B are held together in such manner as to allow the ring B to turn when the locking-pin $d$ is withdrawn.

E is a clip, the closed end of which, as shown, passes over the bail C and enters the recess $e$ in the under face of the plate A. The sides of the clip pass down and through a plate, E', on the under side of the bail, and receive nuts, by means of which the clip can be locked firmly to the bail and form, in connection with the recess $e$, a lock, by which the plate A is held against lateral or end movement on the bail; and by loosening the clip E the plate A can be adjusted laterally on the bail to set the plow for the required width of furrow.

F is the plow-beam, of the usual construction, and provided on its under face, at the point where the pivot or trunnion $a$ comes, with a suitable recess to receive such pivot, and have the pivot form a bearing, on which the plow-beam swings laterally, and carrying at its rear end a plow, F'. This beam F is located, as shown, above the ring or support B, its under face resting, as shown, on blocks $g'$, formed with the ring or support, which blocks can be trued up to have the beam set square, and the beam is held against side or lateral movement by coming between lugs $g$, formed on the ring or support B fore and aft of the opening B'', as shown in Fig. 7.

G are clips, passing, as shown, over the plow-beam and down and through the ends B' of the ring or support, and receiving on their open ends nuts, by which the beam is drawn down and locked firmly to the ring. The clips, as shown, pass through openings in the ends B', which openings are formed at the end of the bed or block $g'$; but the clips could be otherwise attached, and, if desired, the beds or blocks $g'$ could be omitted.

Figs. 1 and 2 show the frame-work and other parts of a sulky-plow; but as such devices form no part of the present invention they are not specifically described, and they are shown only for the purpose of illustrating how the plow-beam is hung and is located in relation to the other parts.

The plow-beam is hung above the bail by placing the clip E on the bail loosely; then setting the plate A and ring B, the plate being within the opening B'', on the bail to have the recess $e$ in the plate A receive the end of the clip E; then passing the clips D up underneath the bail C, and through the plate A, applying the plates D' to their open ends and setting the nuts down, so as to draw the clips D onto the bail and leave the plate A free to turn thereon; then placing the plow-beam on top of the ring or support B over the plate A, with the pivot in the recess in the beam, and passing the clips G over the beam F and down through the ends B' of the ring or support, and securing them by the nuts, so as to firmly lock the beam to the ring or support; and when the parts are together the plate A and ring B are interlocked by the flanges $b$ and projecting edge of the plates D, so that the two will move together with the vertical swing of the beam F, and as the plate A is locked to the bail by the clip E and recess $e$, the ring is also locked against end or lateral movement of the bail.

The ring or support B is free to turn around the plate A when the pin $d$ is withdrawn, allowing the plow-beam to swing freely on the pivot $a$ in a lateral direction, and to be supported in swinging by the broad bearing furnished by the ring or support; and when the pin $d$ is inserted in the hole $c$ the plate A and ring or support B are locked together, holding the plow-beam firmly in a straight line, and preventing any side or lateral swing thereof.

The device is very simple in its construction, and can be readily applied to the bail and beam of plows, and in use requires no changing of the parts to allow the beam to swing free or be locked rigid except the withdrawal and insertion of the pin $d$; and in case the pin should be lost it can be readily replaced by the operator. The support furnished by the plate A and ring B for the plow-beam is one that will not be easily broken, and the adjustment of the beam laterally on the bail is quickly and readily accomplished by simply loosening the clip E, adjusting the beam, and then locking the clip to the bail.

As shown, the beam is mounted over the bail; but by reversing the bed-plate it could be located beneath the bail, in which case the ring B would come on top of the beam, and the center plate A would come beneath the bail, the fastening devices being reversed accordingly, and when the beam is beneath the bail the top of the beam would have the opening for the trunnion $a$.

What I claim as new, and desire to secure by Letters Patent, is as follows:

1. In a sulky-plow, the combination of a plow-beam, F, a plate, B, suspended therefrom and having a circular opening, B'', provided in its edge with a semicircular recess, a circular plate, A, supported by the plate B in its circular opening and provided with a semicircular recess, and a bail, C, loosely connected with the circular plate, substantially as described.

2. The combination of plate A, having the pivot $a$, and in its under face a curved recess, $e$, the ring or support B, having ends B', a plow-beam, F, fitting on a pivot, $a$, and resting on the ends B', a plow-bail, C, and clip E, passing around bail C and fitting in recess $e$, substantially as described.

3. The plate A, having the pivot $a$, and ring or support B, having the ends B' and flanges $b$, in combination with a plow bail and beam, substantially as and for the purposes specified.

4. The plate A, having the pivot $a$, ring or support B, having ends B' and flanges $b$, and opening $c$, formed by semicircular openings in the plate and ring, in combination with a plow bail and beam, and a locking-pin, $d$, substantially as and for the purposes specified.

5. The plate A and ring or support B, constructed as described, in combination with the plow-bail C, clips D E, plow-beam F, and clips G, substantially as and for the purposes specified.

6. The plate A and ring or support B, constructed as described, and locking-pin $d$, in combination with a bail, C, clips D E, plow-beam F, and clips G, substantially as and for the purpose specified.

7. The plate A and ring or support B, constructed as described, in combination with the bail C, clips D E, plates D', plow-beam F, and clips G, substantially as and for the purposes specified.

JOHN F. PACKER.

Witnesses:
   ALBERT H. ADAMS,
   O. W. BOND.